Patented Dec. 21, 1943

2,337,424

UNITED STATES PATENT OFFICE 2,337,424

COATING COMPOSITION FOR METALS

Frank R. Stoner, Jr., Edgeworth, and George W. Seagren, Pittsburgh, Pa., assignors to Stoner-Mudge, Inc., Pittsburgh, Pa., a corporation of Pennsylvania No Drawing. Application March 23, 1943, Serial No. 480,261

4 Claims. (Cl. 260—86)

This invention relates to coating compounds capable of forming protective coatings upon the surfaces of metals. It consists specifically in a resinous coating compound, of which greater than 50 per cent of the resinous solids consist of a chlorine-containing thermoplastic resin normally unstable under the influence of heat when in contact with metallic surfaces, to which has been added an alkyl phosphoric acid, whereby a baked-out film of the coating compound on said metallic surfaces is rendered stable to heat and inhibits underfilm corrosion of the metal, as hereinafter fully described.

The use of chlorine-containing thermoplastic polymers and copolymers as the primary film-forming ingredient in resinous compositions for coating metal surfaces is old in the art. Such resinous polymers and copolymers are characterized by excellent flexibility, by inertness to atmospheric oxidation, by a high resistance to greases, acids, and alkalies, and are moreover tasteless, odorless, and non-toxic. Accordingly, their use in coating compositions for lining metallic food and beverage containers, closures, screw top caps, steel drums, and pails, and similar containers for packaging foods, beverages, cosmetic preparations, syrups, pharmaceuticals, and like products has been widely attempted. Illustrative polymers and copolymers of the kind here contemplated are, polyvinyl chloride, copolymers of vinyl chloride with vinyl acetate, styrene, methyl methacrylate, ethyl acrylate, maleic anhydride, and diverse other non-chlorine-containing monomers; polyvinylidene chloride and its copolymers with methyl methacrylate, styrene, vinyl acetate, maleic anhydride, ethyl acrylate, and diverse other non-chlorine-containing monomers; alpha chloro acrylic polymers together with copolymers of alpha chloro acrylic esters, amides, and nitriles, with diverse non-chlorine-containing monomers; chlorinated rubber; rubber hydrochloride; and polymerized 2-chloro butadiene.

It is a common characteristic of all such polymers and copolymers that they are long-chain molecules of average molecular weights in the approximate range of 2500–50,000, made up of carbon-to-carbon chains wherein carbon atoms carrying at least one chlorine atom are statistically alternated with carbon atoms carrying one or more hydrogen atoms and no chlorine atoms. And herein lies the reason for their well-known instability to heat—an instability which is accentuated by contact with metal surfaces, particularly if these be capable of forming soluble acidic salts with the hydrochloric acid arising from thermal decomposition of the chlorine-containing polymers and copolymers.

We shall, for the sake of brevity, hereafter refer to these chlorine-containing polymers and copolymers as "chlorine-containing thermoplastic resins," and it will be understood that we mean to include any and all of the resinous bodies obtained by polymerizing vinyl chloride, vinylidene chloride, and/or alpha chloro acrylate monomers, alone or conjointly with other monomeric olefinic bodies; and we mean to include chlorinated rubber, rubber hydrochloride, and polymerized 2-chloro butadiene. Thus, by the term "chlorine-containing thermoplastic resin," we mean to include any so-called straight chain, or "aliphatic" polymer and/or copolymer which contains sufficient carbon-to-chlorine linkages as to be capable of liberating hydrochloric acid under the influence of heat.

It has been found by experiment, and is generally well known, that chlorine-containing thermoplastic resins containing more than 5 per cent by weight of chlorine are subject to this instability to heat; and the more frequently-employed polymers contain substantially more chlorine than this figure.

The following table lists the weight per cent of chlorine in a number of illustrative commercially employed polymers.

Table 1

| Resin | Weight per cent of chlorine |
|---|---|
| Polyvinyl chloride | 57 |
| Polyvinyl chloride-acetate copolymers (range 65/35 to 95/5) | 31–50 |
| Polyvinylidene chloride | 73 |
| Chlorinated rubbers | 45–55 |
| Polychloroprene | 40 |
| Polymethyl, alpha-chloro acrylate | 34 |

These chlorine-containing thermoplastic resins, alone or admixed with up to 50 per cent of non chlorine-containing compatible film-forming materials, either natural or synthetic, and dispersed in suitable organic solvents, such as mixtures of aromatic hydrocarbons with aliphatic ketones, aliphatic esters, and nitroparaffins, are the principal ingredient of our improved coating compounds. Among the non-chlorine-containing compatible film-forming materials which may thus form up to 50 per cent of the total resinous solids may be mentioned polybasic acid-polyhydric alcohol resins (alkyds), phenol-aldehyde resins, urea-formaldehyde resins, melamine resins, nitrocellulose, cellulose esters and ethers, rosin-drying oil complexes, ester gum, natural resins such as copal, kauri gum, Congo resin, and similar resins of the greatest diversity and variety.

Resinous compositions based on chlorine-containing thermoplastic resins alone or admixed with other particular film-forming materials are not new in the art. Their use for coating metal surfaces has, however, been seriously limited because of two fatal deficiencies. (1) Such coatings must be baked at temperatures substantially above 225° F., and usually approaching 350–375° F. in order to attain sufficient adhesion to the metal substrate as to withstand normal abuse due to handling, bending, denting, crimping, and the like; at these latter baking temperatures serious thermal decomposition with darkening, charring, embrittlement and general loss of film integrity results on the usual metals such as iron, zinc, tinplate, galvanized iron, tin, and brass. (2) When stored at room temperatures for periods of time in excess of 3–7 weeks, at relative humidities exceeding 35–40 per cent, such coated metal surfaces exhibit an unsightly and detrimental corrosion of the surface beneath the intact resin film which becomes progressively worse with longer storage times. This "underfilm corrosion" is a result of the slow diffusion of water vapor and oxygen through the resin film, and is greatly accelerated by the small but finite concentrations of hydrochloric acid liberated within the film by the chlorine-containing constituents even at normal storage room temperatures (45–95° F.). The underfilm corrosion manifests itself as minute specks, as patches of discolored areas, and most frequently as long, filament-like threads and snarls which follow no particular pattern. The phenomenon is most serious on ferrous metals, less unsightly but equally deleterious on tin, aluminum and zinc. With the increased emphasis in industry on use of coated steel for drums, pails, closures and containers to replace tinplate and galvanized iron, the problem has become of major importance.

The generally accepted practice in the past has been to employ varnish-type priming coats under the unstable chlorine-containing thermoplastic resin coatings. Isolated from the metal surface, excessive thermal breakdown during the baking operation is thus minimized. Succeeding slow decomposition to give accelerated underfilm corrosion is not, however, inhibited by such varnish-type primers. Alternatively, it has been proposed to passivate the metal surface—usually steel—prior to coating, by use of an aqueous phosphoric acid wash; such a treatment is described, for example, in U. S. Patent 2,125,387. It has also been proposed to add a small amount of phosphoric acid (suitably about 0.1%) directly to the chlorine-containing thermoplastic resin solution, as is described in U. S. Patent 2,060,572. Finally, alkali metal phosphates and sulfides are suggested as additives in U. S. Patent 2,160,061.

The disadvantages of these various modes of procedure are obvious, and they have not met with wide acceptance in the art. Any preliminary phosphatizing treatment requires elaborate pickling, washing, and treating baths for really satisfactory performance; handling and processing steps are tedious, and in general, the process is not readily adapted to closure and container production lines. The addition of phosphoric acid or calcium acid phosphate directly to the coating solution eliminates the pretreatment steps, but these ingredients are not actually soluble in the organic solvents used to formulate resin solutions. Accordingly, only very small amounts (in the range of 0.1%) can be added and dispersed without almost instantaneous separation to the bottom of the container or storage tank holding the coating composition. Substantially greater amounts of phosphate-film producing reagent than the above 0.1 per cent are necessary for adequate passivation of the metal surface; so that while protection against thermal breakdown of the coating during the bake may be realized, actual experience has demonstrated that subsequent underfilm corrosion is in no way reduced by the presence of phosphoric acid or salts at this low concentration level. Another known disadvantage of compositions containing phosphoric acid and/or its salts is that the moisture resistance of coatings derived from them is seriously reduced because of the hygroscopic nature of phosphoric acid and acid phosphate salts.

We have now found that all of these disadvantages may be overcome if we employ as the added passivating agent an aromatic hydrocarbon-soluble alkyl mono-ester of phosphoric acid selected from the group consisting of methyl, ethyl, propyl and butyl phosphoric acids. And our invention consists of a thermally stable and underfilm corrosion-inhibitive coating composition of which the resinous solids include at least 50 per cent by weight of a chlorine-containing thermoplastic resin, to which has been added a substantial amount, varying from 0.5 to 10 per cent based on the total resin solids, of an aromatic hydrocarbon-soluble alkyl mono-ester of phosphoric acid selected from the above defined group. Our preferred compositions contain 2–4 per cent of alkyl phosphoric acid, based on the total resin solids.

We have experimented widely, and find that only the alkyl mono-esters of phosphoric acid in which the alkyl group contains no more than 4 carbons are satisfactory for our purpose. Thus, the amyl and hexyl mono-esters, while completely soluble in the coating composition, are ineffective in preventing underfilm corrosion. Our experiments show that within our group of four reagents, the order of increasing efficiency is butyl-, propyl-, ethyl-, to methyl monophosphate. We have experimented further, and have found that di-substituted alkyl esters of phosphoric acid are relatively ineffective for our purpose; the tri-substituted esters are, of course, completely ineffective for passivating metals against corrosive attack.

The following compositions will serve to illustrate our invention, it being understood that we are not limited to the specific resins and stabilizing reagents therein described.

Example 1

| | Per cent |
|---|---|
| Copolymer of vinyl chloride (65%) and vinyl acetate (35%) | 20.0 |
| 4-second nitrocellulose | 5.0 |
| Ethyl monophosphate | 2.5 |
| Ethyl acetate | 12.5 |
| Methyl isobutyl ketone | 20.0 |
| Toluol | 40.0 |
| | 100.0 |

The above composition was sprayed on commercial sheet steel and thereafter baked 15 minutes at 350° F. There was no visible thermal decomposition, and coated sheets stored for 4 months at 70° F. and 65% relative humidity showed no evidence of underfilm corrosion. Duplicate panels, coated with an identical formulation except containing no ethyl mono phosphate, were badly decomposed by the 350° F. bake, and thereafter developed severe threadlike underfilm corrosion in less than 3 weeks' exposure at 70° F. and 65% R. H.

Example 2

| | Per cent |
|---|---|
| Copolymer of vinyl chloride (87%) vinyl acetate (12%) and maleic anhydride (1%) | 16.0 |
| Phenolic resin derived from o-cresol and formaldehyde (NH₄OH catalyzed) | 4.0 |
| N-propyl monophosphate | 0.5 |
| N-butyl alcohol | 2.0 |
| Methyl ethyl ketone | 8.0 |
| Methyl isobutyl ketone | 30.0 |
| Xylol | 39.5 |
| | 100.0 |

The above composition was roll-coated on sheet steel and thereafter baked 20 minutes at 400° F. There was no visible thermal decomposition, and no evidence of underfilm corrosion developed after 6 months' storage at 70° F. and 65% R. H.

Example 3

| | Per cent |
|---|---|
| Copolymer of vinylidene chloride (90%) and ethyl acrylate (10%) | 18.0 |
| N-butyl monophosphate | 1.8 |
| Ethylene dichloride | 40.2 |
| Toluol | 30.0 |
| Mineral spirits | 10.0 |
| | 100.0 |

The above composition was roll-coated on tinplate and thereafter baked 20 minutes at 350° F. There was no visible thermal decomposition, and stored panels developed only traces of underfilm corrosion in 3 months' storage at 70° F. and 65% R. H.

Example 4

| | Per cent |
|---|---|
| Copolymer of vinyle chloride (85%) and vinyle acetate (15%) | 16.0 |
| Soyabean oil-modified glycerylphthalate alkyd resin | 4.0 |
| Methyl monophosphate | 0.1 |
| Methyl isobutyl ketone | 34.9 |
| Xylol | 45.0 |
| | 100.0 |

The above composition was roll-coated on sheet zinc and thereafter baked 15 minutes at 300° F. There was no visible thermal decomposition, and stored panels showed no evidence of underfilm corrosion in 6 months' storage at 70° F. and 65% R. H.

Example 5

| | Per cent |
|---|---|
| Chlorinated rubber (49% Cl) | 19.2 |
| Ethyl monophosphate | 0.8 |
| Methyl ethyl ketone | 40.0 |
| Toluol | 40.0 |
| | 100.0 |

The above composition was spray-coated on sheet steel and thereafter baked 20 minutes at 350° F. There was no visible thermal decomposition, and stored panels showed no evidence of underfilm corrosion after 4 months' storage at 70° F. and 65% R. H.

Example 6

| | Per cent |
|---|---|
| Copolymer of vinyl chloride (87%) and vinyl acetate (13%) | 20.0 |
| Ethyl monophosphate | 0.6 |
| Methyl ethyl ketone | 35.0 |
| Isophorone | 4.4 |
| Toluol | 30.0 |
| Hi-flash naphtha | 10.0 |
| | 100.0 |

The above composition was spray-coated on sheet steel and thereafter baked 15 minutes at 385° F. There was no visible thermal decomposition, and stored panels showed no evidence of underfilm corrosion after 3 months' storage at 70° F. and 65% R. H.

The weight percentages of alkyl phosphoric acids in the above illustrative examples, based on the resinous solids, are as follows:

| | Per cent |
|---|---|
| Example 1 | 10.0 |
| Example 2 | 2.5 |
| Example 3 | 10.0 |
| Example 4 | 0.5 |
| Example 5 | 4.0 |
| Example 6 | 3.0 |

Among these examples, the weight percentages exhibited by Examples 2, 5, and 6 are preferred, though all of the compositions are satisfactory for our purposes.

And now, having described our invention and shown the advantages attending its use.

We claim as our invention:

1. A thermally stable and corrosion-inhibitive coating composition for metals, adapted to be applied and thereafter baked at temperatures exceeding 225° F., in which the film-forming solids comprise at least 50 per cent of a chlorine-containing thermoplastic resin in which the chlorine atoms are attached to carbon atoms in aliphatic chains and which normally decomposes to liberate deleterious amounts of hydrochloric acid under conditions of the bake, containing from 0.5 to 10 per cent, based on the total film-forming solids, of a stabilizing and corrosion-inhibitive substance selected from the group consisting of the methyl, ethyl, propyl, and butyl mono-esters of phosphoric acid, together with a solvent mixture for the whole.

2. The composition of claim 1 in which the chlorine-containing thermoplastic resin is a copolymer of vinyl chloride and vinyl acetate containing at least 5 per cent by weight of chlorine.

3. The composition of claim 1 in which the added stabilizing and corrosion-inhibitive substance is ethyl monophosphate.

4. A sheet of metal, bearing on at least one surface a baked on resinous coating comprising at least 50 per cent of a chlorine-containing thermoplastic resin in which the chlorine atoms are attached to carbon atoms in aliphatic chains and which normally decomposes to liberate deleterious amounts of hydrochloric acid under conditions of the bake, and from 0.5 to 10 per cent, based on the total resin content, of a stabilizing and corrosion-inhibitive substance selected from the group consisting of the methyl, ethyl, propyl, and butyl mono-esters of phosphoric acid, said coated sheet of metal being characterized by thermal stability of the coating at temperatures exceeding 225° F., and substantially complete resistance to underfilm corrosion under normal conditions of storage and use.

FRANK R. STONER, Jr.
GEORGE W. SEAGREN.